Nov. 17, 1931.  O. G. TAGUE  1,832,265
POSTER DISPLAYING DEVICE
Filed July 22, 1927   2 Sheets-Sheet 1
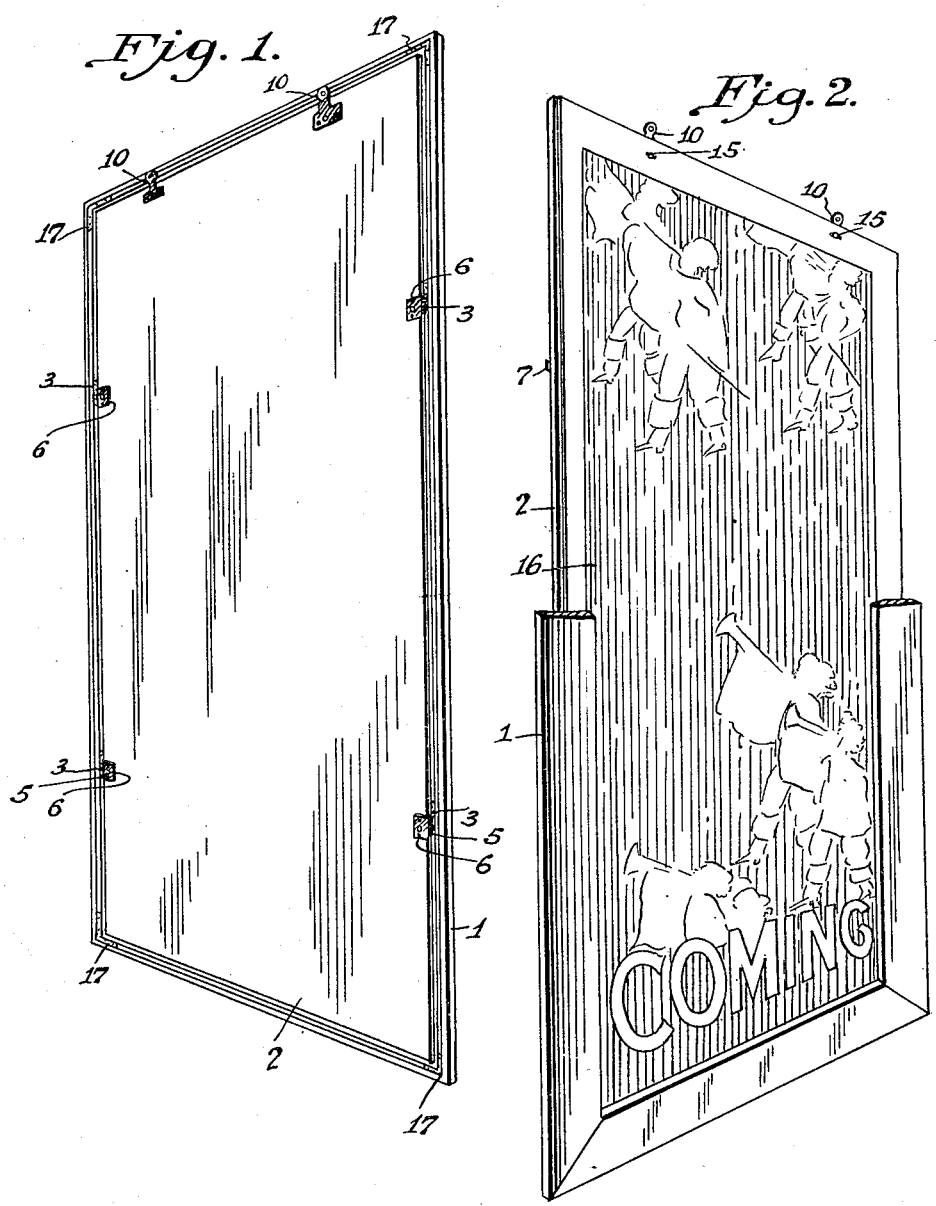
Inventor
Otto G. Tague
By Parker & Carter
Attys Nov. 17, 1931.  O. G. TAGUE  1,832,265
POSTER DISPLAYING DEVICE
Filed July 22, 1927   2 Sheets-Sheet 2
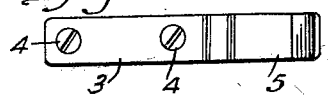
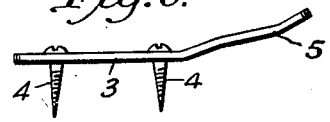
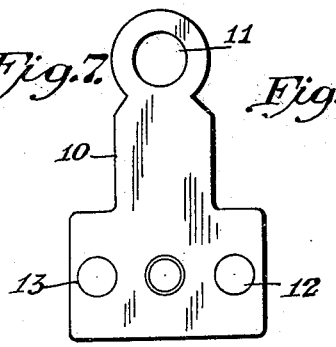
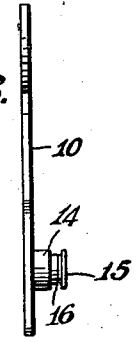
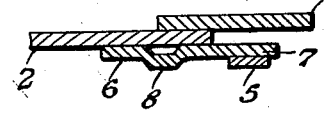
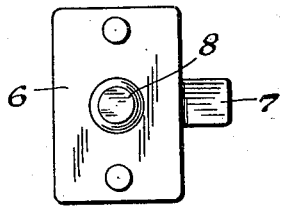
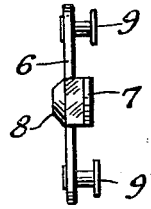
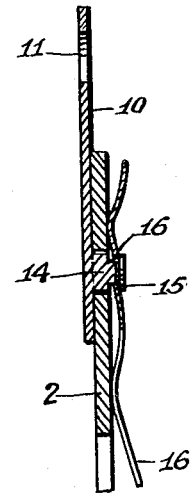
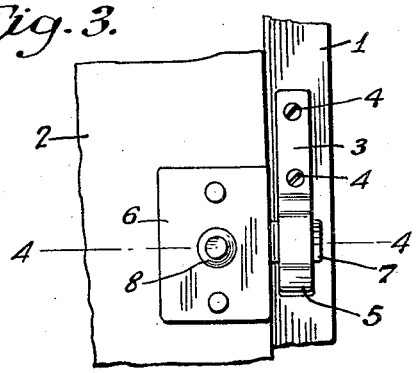
Inventor
Otto G. Tague
By Parker & Carter
Attys.

Patented Nov. 17, 1931

1,832,265

UNITED STATES PATENT OFFICE

OTTO G. TAGUE, OF CHICAGO, ILLINOIS, ASSIGNOR TO MATHER AND COMPANY, OF CHICAGO, ILLINOIS, A CORPORATION OF ILLINOIS

POSTER DISPLAYING DEVICE

Application filed July 22, 1927. Serial No. 207,633.

This invention relates to improvements in poster displaying devices and has for its object to provide a new and improved device of this description.

The invention has as a further object to provide a poster displaying device by means of which art posters, bulletins, photographs, announcements, paintings, sheets of paper, cloth or other material whether printed, lithographed or otherwise prepared for display, may be quickly, easily and securely mounted for display and easily and quickly removed so that other articles may be substituted therefor.

The invention has further objects which are more particularly pointed out in the accompanying description.

Referring now to the drawings,

Fig. 1 is a perspective rear view showing the back and front fastened together.

Fig. 2 is a perspective view showing the front of the device with the upper part of the frame removed showing the poster attached to the back.

Fig. 3 is an enlarged view showing the fastening members on the back and frame in their co-operative position.

Fig. 4 is a sectional view taken on line 4—4 of Fig. 3 showing the edge of the back and the frame in their co-operative position.

Fig. 5 is an enlarged front view of one of the fastening devices on the frame.

Fig. 6 is a side view of the fastening device shown in Fig. 5.

Fig. 7 is a front view of one of the hangers by means of which the device is supported on the wall.

Fig. 8 is a side view of the hanger shown in Fig. 7.

Fig. 9 is a front view of one of the fastening devices on the back.

Fig. 10 is a side view of the fastening device shown in Fig. 9.

Fig. 11 is an enlarged sectional view taken on line 11—11 of Fig. 2.

Referring now to the drawings, I have shown a device consisting of a removable frame 1 and a back 2. The back is supported upon a suitable support and the frame is removably connected therewith. The frame is provided with fastening devices 3 attached to the frame by the screws 4 and having a projecting hook 5 at the end thereof. I have shown four such fastening devices. The back 2 is provided with fastening devices 6 which have projecting lugs 7, (see Fig. 9), which are arranged to project under the hooks 5 when the back is in position.

The hooks 5 are inclined so that when the lugs 7 are moved thereunder, the frame is pressed tightly toward the back so as to engage the poster between the back and the frame and hold it securely in position. The fastening devices 6 are provided on their rear faces with projections 8 which engage the wall or surface upon which the device is supported so as to hold the frame and back a proper distance from the wall or part upon which the device is mounted to avoid injury thereto and also provide sufficient clearance between the frame and the wall to allow the hooks on the back of the frame to easily and unobstructedly engage the lugs on the board. The fastening devices 6 are fastened to the back in any desired manner, as by means of rivets 9. The back is provided with one or more hangers 10 which are provided with holes 11 by means of which the device may be supported on supports connected with the wall. These hangers are connected with the board 2 by rivets or other fastening devices extending through the holes 12 and 13. These hangers are provided with poster supports 14 which project through an opening in the board 2 and upon which the poster is supported prior to the frame being placed in position. The posters are provided with holes properly positioned to receive the supports 14 and some means is preferably provided for preventing the posters from easily slipping off of these supports.

This may be accomplished by providing the supports with an enlarged end 15. A convenient manner of forming this enlarged end is to provide each support with a groove 16 into which a portion of the poster is received. (See Fig. 11). The sections of the frame are connected together by means of the corner pieces 17 which are fastened to the frame by the screws or the like 18.

I have described in detail a particular device embodying the invention but it is, of course, evident that the parts may be varied in many particulars without departing from the spirit of the invention as embodied in the claims hereto appended, and I, therefore, do not limit myself to the particular construction shown.

The use and operation of my invention are as follows.

When the device is in use, the back 2 is supported upon a wall or other supporting device by means of the hangers 10. When it is desired to insert a poster or other device to be displayed the frame 1 is removed from the back by lifting it upwardly so as to disconnect the hooks 5 of the fastening devices 3 from the lugs 7 of the fastening devices 6 on the back. The poster is then placed on the poster supports 14 back of the enlarged ends 15, the supports being inserted in openings in the poster. The poster will then be supported in position on the back, as shown in Fig. 4 and will remain in this supported position as long as desired. The frame 1 is then replaced on the back, by moving the hooks 5 into engagement with the projections 7 of the fastening devices on the back. The moving down of the frame causes the frame to be moved toward the back so as to tightly clamp the edges of the poster between the back and the frame and securely hold it in position. It will thus be seen that the posters can be easily and effectively displayed by means of this device and that such posters may be easily and quickly removed and others substituted therefor.

In the claims, I have used the term "poster" but I mean to include under this term any device which it is desired to display and which can be inserted in the frame.

I claim:—

1. A poster display device comprising a frame, a back therefor, means for supporting said back in position separate from said frame, supporting means for supporting a poster on said back independent of the frame and cooperating fastening devices connected with said back and frame each fastening device being fixed with relation to the part with which it is connected, the cooperating fastening devices having relatively sliding fastening parts which are engaged and disengaged by a relative movement of the back and frame and by means of which the back and frame may be removably connected together or separated from each other.

2. A poster displaying device comprising a frame, a back therefor, means for supporting a poster on said back, fastening devices connected with said back and frame at separated points thereabout by means of which the back and frame may be removably connected together, means for supporting said back on a wall, and projections on the fastening devices on the back which engage said wall and provide a clearance between the back and said wall.

3. A poster displaying device comprising a back, a hanger connected with said back and by means of which it may be supported in position, a poster support connected with said hanger and upon which the poster is supported while the back is separate from the frame, a frame and cooperating fastening devices on the frame and on the back, said fastening devices having relatively sliding engaging parts in substantially parallel planes when in their operative positions, said fastening devices adapted to be removably secured together by relative movement of the frame and back to connect the frame and the back so that the poster on the back will show through the frame.

4. A poster displaying device comprising a back, a frame, means for supporting said back separate from said frame, a poster support projecting from the top of said back and upon which the poster is supported and a frame removably connected with said back and means for removing said frame from said back while said back is in its supported position.

5. A poster displaying device comprising a back, means for supporting said back on a wall, a poster support projecting from the top of said back and upon which the poster is supported, a frame removably connected with said back, and means for attaching said frame to and removing it from said back while the back is supported on the wall.

Signed at Chicago, county of Cook, and State of Illinois, this 30th day of June, 1927.

OTTO G. TAGUE.